May 3, 1932.  W. A. COTES  1,856,277
WHEEL ASSEMBLY MACHINE
Filed Feb. 3, 1930
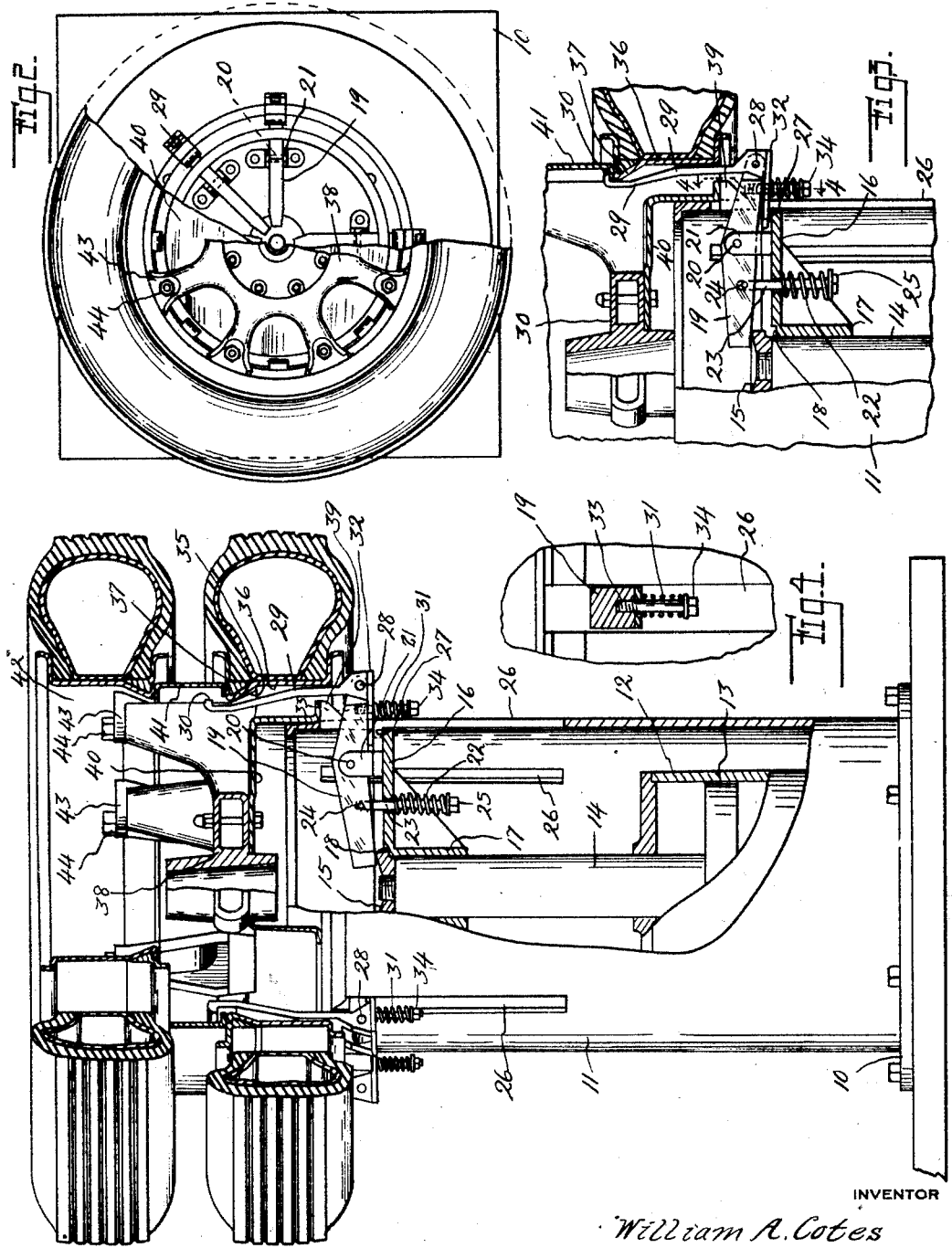
INVENTOR
William A. Cotes
BY Whittemore Hulbert
Whittemore & Belknap
ATTORNEYS Patented May 3, 1932

1,856,277

UNITED STATES PATENT OFFICE

WILLIAM A. COTES, OF LANSING, MICHIGAN, ASSIGNOR TO REO MOTOR CAR COMPANY, OF LANSING, MICHIGAN, A CORPORATION OF MICHIGAN

WHEEL ASSEMBLY MACHINE

Application filed February 3, 1930. Serial No. 425,654.

This invention relates to a machine or fixture for assembling and truing tire carrying rims on wheels and has as its object to simplify, render more efficient and improve generally devices of this character.

The invention while finding utility in the assembly of single tire wheels has particular utility in assembling dual wheels. It is particularly important in dual wheels that the two rims and tires be accurately assembled with respect to the wheel as otherwise the tires wear unevenly in use because the tires do not roll squarely on the tread throughout the circumference thereof.

The present invention finds particular utility in factories where a large number of dual wheels are assembled and to this end the invention contemplates the provision of means whereby the wheels and tire bearing rims may be quickly located and approximately assembled and subsequently accurately assembled and held in this position while the ordinary rim engaging lugs are secured in place. To this end the invention contemplates a plurality of rim engaging arms or members adapted to be passed between the rim and wheel and to engage the rim at a plurality of circumferentially spaced points and to draw the same evenly and accurately into engagement with the wheel. When thus held the spacer ring and the remaining rim employed in dual wheels may be quickly and easily assembled and the entire structure united by means of the usual rim engaging lugs.

The several objects, advantages and novel details of construction will be made more apparent as this description proceeds, especially when considered in connection with the accompanying drawings wherein Figure 1 is a sectional elevational view of a machine or fixture constructed in accordance with my invention;

Figure 2 is a top plan view partly in elevation and partly in section;

Figure 3 is a fragmentary vertical sectional view similar to Figure 1 with the parts in different position, and Figure 4 is a fragmentary detail sectional view taken substantially on the plane indicated by line 4—4 in Figure 3.

Referring now more particularly to the drawings wherein like reference characters indicate like parts, it will be noted that the machine comprises a base 10 from which a preferably tubular frame member 11 projects upwardly. Arranged within the frame member 11 is an air cylinder 12 in which a piston 13 reciprocates. The piston 13 is provided with a rod or plunger 14 having a cam or actuating member 15 on the upper end thereof.

Slidably mounted on plunger 14 is a plate-like member or platform 16, the latter being provided with a tubular sleeve-like hub 17 surrounding the plunger 14. The upward movement of the plate-like member 16 with respect to the plunger 14 is limited by the engagement of the plate-like member with an annular shoulder 18 provided on the cam member 15.

Mounted upon the plate 16 at a plurality of circumferentially spaced points are rockable arms or levers 19, each lever being pivotally supported as at 20 on a bracket 21 carried by the plate 16. The inner ends of the levers 19 engage the cam member 15 and the plate member 16 is normally held in engagement with the shoulder 18, and thus in the position illustrated in Figure 1, by means of springs 22 surrounding pins 23 pivoted as at 24 to the levers 19. These pins pass through apertures in the plate 16 and the springs 22 bear against the underside of the plate 16 on the one hand and against heads 25 on the lower ends of the pins. Thus the plate member 16 is normally held against the annular shoulder 18 and the inner ends of the levers 19 are normally urged downwardly and into engagement with the cam member 15.

The tubular support 11 is provided with a number of vertically extending slots 26 corresponding to the number of levers 19 so that these levers, together with the plate 16 and plunger 14, may partake of vertical reciprocatory movements. However, the upward movement of plate 16 is limited by its engagement with an annular shoulder or ledge constituting a stop 27 provided on the inner surface of the tubular support in 11. Thus, during the upward movement of plunger 14 the whole structure will move until the plate member 16 engages the stop 27 whereupon this plate member will be held and the plunger will continue upwardly to rock the levers 19 as suggested in Figure 3.

Pivotally mounted as at 28 to the outer end of each lever 19 is a rim engaging member or arm 29 provided with a hooked end 30. Each arm 29 is yieldably maintained at a substantial right angle to its lever 19 by means of a spring 31 which bears against a cam plate 32 fixed to the lower end of each arm and normally lying against the lower side of its corresponding lever 19. This spring is carried on a pin, the upper end of which is threaded into the lever 19 as indicated at 33, while the lower end is provided with a head 34 against which the lower end of the spring engages. Thus, while the lever 19 and arm 29 normally assume the position illustrated in Figure 1, the lever 19 may be rocked about its pivot, and under certain conditions cause the arm 29 to partake of a pivotal movement about pivot 28 and assume the position illustrated in Figure 3.

The problem involved in assembling tire carrying rims and wheels of this character is that of accurately engaging the angular or beveled surface 35 of rim 36 with the angle 37 on the wheel 38. If this is not done, then rim 36 is not true or aligned with the axis of the wheel and as a consequence this tire and the other tire in dual wheels will not roll squarely on the tire tread when in use.

In accordance with this invention the supporting frame 11 carries an annular rib or ledge 39 constituting a support for the wheel through the intermediary of the brake drum 40. The upper surface of this support 39 is accurate, that is, the horizontal plane thereof is arranged at a right angle to the axis of the wheel. This support is also accurately spaced throughout with respect to annular stop 27 so that in the subsequent operation of the device, yet to be described, when the wheel has been positioned upon the support 39 the rim 36 may, by the herein described mechanism, be accurately drawn into engagement with the wheel.

The reference character 41 indicates a spacer ring usually employed in connection with dual wheels and 42 indicates the tire carrying rim engaged with the edge of the spacer ring, the whole structure being tied together by means of lugs 43 and nuts 44 as is customary.

In operation the wheel 38 is placed upon the support 39, and the rim 36 is loosely placed thereon. Then air is admitted to the cylinder 12 under piston 13 to raise plunger 14. The plunger 14 carries with it plate member 16 together with the plurality of circumferentially spaced levers 19 and arms 29. The arms 29 are of such dimension and are so shaped that they will thread themselves through the space between the outer periphery of the brake drum 40 and the inner surface of rim 36, the resilient pivotal connection between levers 19 and arms 29 permitting this movement. As the plunger 14 approaches the end of its upward stroke, the plate 16 comes into engagement with the annular stop 27 which thus limits the further upward movement of plate 16 and consequently of levers 19 and arms 29. Because the stop 27 is accurately spaced throughout with respect to the support 39, all of the levers 19 and arms 29 are elevated to the same extent and are in a position to subsequently accurately engage the rim throughout its diameter. The position of the parts at this moment is illustrated in Figure 1. The continued movement of plunger 14 causes this plunger to move relative to plate 16 and to the position illustrated in Figure 3 where levers 19 are rocked about their pivots 20. This moves the upper hooked ends 30 of arms 29 radially outwardly until they engage the rim 36 or, as illustrated, the rim and the lower edge of spacer ring 41. Thereafter, the continued upward movement of plunger 14 further rocks the levers 19 and causes the arms 29 to travel downwardly. During this downward movement the hooked ends 30 grip the spacer ring 41 and rim 36 at a plurality of circumferentially spaced points and thus draw the rim downwardly into accurate engagement with the angle face 37 on the wheel. The arms 29 will thus hold the wheel and inner rim and spacer ring accurately in place while the outer rim 42 is being assembled therewith whereupon the lugs 43 may be secured in place to unite the entire structure. Thereafter, air is introduced into the upper end of cylinder 12 which effects a releasing movement of the arms 29 and causes the entire structure to descend to a point where the arms 29 are below the lower edge of rim 36 whereupon the assembled wheel may be readily removed.

The device is simple and may be quickly and easily operated and effectively accomplishes its purpose in a commercially practical manner. Various changes and modifications may obviously be resorted to without departing from the spirit and scope of the invention and to this end reservation is made to make such changes as may come within the purview of the accompanying claims.

What I claim as my invention is:

1. In a device for assembling tire carrying rims with wheels, a support for the wheels having a rim loosely mounted thereon, a reciprocable plunger, a plate member carried thereby, a plurality of rockable levers mounted on said plate, rim gripping arms carried by said levers, means for moving said plate member to position said arms to grip said rim and means on said plunger for rocking said levers to cause said arms to draw said rim uniformly onto the wheel.

2. In a device for assembling tire carrying rims with wheels, a horizontal support for the wheel, the wheel having a rim loosely mounted thereon, a vertically reciprocable plunger having a cam member on its upper end, a plate member movable upwardly with said plunger, a stop for limiting the upward movement of said plate, said stop being accurately positioned with respect to said support, a plurality of circumferentially arranged levers rockably mounted on said plate, rim grippers carried by the outer ends of said arms, the inner ends of said arms being engaged by said cam whereby when said plunger moves upwardly said plate, levers, and grippers partake of this upward movement until said plate engages said stop, whereupon said grippers are in position to engage said rim, the continued upward movement of said plunger causing said cam to rock said levers to draw said grippers downwardly to uniformly engage said rim with said wheel.

3. In a device for assembling tire carrying rims with wheels, a support for the wheel, the wheel having a rim loosely mounted thereon, a rod mounted for vertical movement, a cam member carried on the upper end of said rod, a horizontal plate member slidably mounted on said rod and normally held in engagement with said cam, a plurality of circumferentially arranged levers rockably mounted on said plate, resilient means carried by said levers and engaging said plate member to normally hold the same in engagement with said cam, rim gripping arms pivotally mounted on said levers at the outer ends of the latter, resilient means normally maintaining said arms at a predetermined angle with respect to said levers, and a stop for limiting the upward movement of said plate member whereby on the upward movement of said rod, said plate member, levers and arms will be moved upwardly to bring said arms into position to engage said rim whereupon the upward movement of said plate member will be arrested by said stop and the continued movement of said plunger will cause said cam to rock said levers to draw said gripper arms downwardly and draw said rim uniformly onto said wheel.

4. In a device of the character described, a support for a wheel and a rim loosely associated with the wheel, a rim engaging member, an actuating member, and means operable upon continuous movement of said actuating member in one direction to first move said rim engaging member in one direction to a position to engage said rim and to then move said rim engaging member in an opposite direction to force said rim into firm engagement with said wheel.

5. In a device of the character described, a support for a wheel and a rim loosely associated with said wheel, a rim engaging member, a vertically reciprocable actuating member, means operable upon a predetermined vertical movement of said actuating member to move said rim engaging member upwardly to a position to engage said rim, and means operable upon a further vertical movement of said actuating member in the same direction to move said rim engaging member downwardly to force said rim into firm engagement with said wheel.

6. In a device of the character described, a support for a wheel and a rim loosely associated with said wheel, a plurality of circumferentially arranged rim engaging arms, a vertically reciprocable plunger, means operable upon a predetermined upward movement of said plunger to move said arms upwardly to a position to engage said rim, and means operable upon a further upward movement of said plunger to cause said arms to move downwardly to force said rim firmly into engagement with said wheel.

7. In a device of the character described, a support for a wheel and a rim loosely associated with said wheel, a rim engaging arm, a rockable lever mounting said arm, and means for moving said arm and lever to position said arm to engage said rim and for then rocking said lever to cause said arm to draw said rim into engagement with the wheel.

8. In a device of the character described, a support for a wheel and a rim loosely associated with said wheel, a plurality of circumferentially arranged rim gripping arms, a lever pivotally connected to each arm, a support for rockably mounting each lever, and means for moving all of said supports to position said arms to engage said rim and for then rocking said levers about said supports to cause said arms to force the rim into engagement with the wheel.

9. In a device of the character described, a support for a wheel and a rim loosely associated with the wheel, a plurality of rim gripping arms, a lever pivotally mounting each arm, a support for rockably mounting each lever, a vertically movable actuating member, means operable upon a predetermined upward movement of said actuating member to move said supports to position said arms adjacent the rim, and means operable upon a further upward movement of said actuating member to rock said levers about their supports to cause said arms to draw the rim into engagement with the wheel.

10. In a device of the character described, a support for a wheel and a rim loosely associated with the wheel, a vertically reciprocable plunger, a plurality of rim engaging arms, a plate movable with said plunger, levers carried by said plate and mounting said rim engaging arms, and means for vertically moving said plunger, said plate being movable with said plunger during a predetermined portion of its vertical movement to provide for movement of said arms to a position to engage said rim, and said levers being so arranged relative to said plunger as to be actuated thereby to cause said arms to draw said rim into engagement with the wheel after the plate has reached the limit of its movement with said plunger.

11. In a device of the character described, a support for a wheel and a rim loosely associated with said wheel, a rim engaging member, an actuating member, and means operable upon continuous movement of said actuating member in one direction to first move said rim engaging member from a position without the rim to a position within said rim and to then move said rim engaging member to force said rim into firm engagement with said wheel.

12. In a device of the character described, a support for a wheel and a rim loosely associated with the wheel, a rim engaging member, a support for said member, and actuating means continuously operable in one direction to first move said rim engaging member and said support in one direction to a position where said rim engaging member is adapted to engage said rim and to then move said rim engaging member in an opposite direction and relative to said support to cause the rim engaging member to force said rim into firm engagement with said wheel.

13. In a device of the character described, a support for a wheel and a rim loosely associated with said wheel, a plurality of rim engaging arms, means including a plate for supporting said arms, a member for moving said plate and said arms to position the latter in a position to engage said rim, means for limiting movement of said plate, and means operable upon a further movement of said plate-moving member in the same direction and after movement of said plate has been limited to cause said arms to force said rim into firm engagement with the wheel.

14. In a device of the character described, a support for a wheel and a rim loosely associated with said wheel, a plunger, a plate movable with said plunger, levers rockably mounted on said plate, rim engaging members carried by said levers, means for moving said plunger to move said plate to a position where said rim engaging members are in a position to engage said rim, means for limiting movement of said plate, and means operable upon further movement of said plunger in the same direction and after movement of said plate has been limited to effect a rocking of said levers to cause said rim engaging members to force the rim into firm engagement with said wheel.

In testimony whereof I affix my signature.
WILLIAM A. COTES.